United States Patent [19]  [11] 4,067,841
Aurichio  [45] Jan. 10, 1978

[54] VINYL CHLORIDE INTERPOLYMER COATING COMPOSITION

[75] Inventor: Joseph A. Aurichio, Bronx, N.Y.

[73] Assignee: Stauffer Chemical Company, Westport, Conn.

[21] Appl. No.: 619,717

[22] Filed: Oct. 6, 1975

Related U.S. Application Data

[62] Division of Ser. No. 474,747, May 30, 1974, Pat. No. 3,997,704.

[51] Int. Cl.² ............... C08K 5/07; C08K 5/15; C08L 27/06
[52] U.S. Cl. ............... 260/30.4 R; 260/32.8 R; 260/884
[58] Field of Search ............. 260/884, 30.4 R, 32.8 R; 526/17, 56

[56] References Cited

U.S. PATENT DOCUMENTS

| | | | |
|---|---|---|---|
| 3,504,053 | 3/1970 | Williams | 260/884 |
| 3,764,638 | 10/1973 | Hwa et al. | 260/884 |
| 3,903,198 | 9/1975 | Wei | 260/884 |

*Primary Examiner*—Harry Wong, Jr.
*Attorney, Agent, or Firm*—Richard P. Fennelly

[57] ABSTRACT

A process for coating a material, e.g. a vinyl material, to improve its wear resistance and the coated article produced thereby is disclosed. The coating comprises an interpolymer comprising from about 50-95% by weight polyvinyl chloride and from about 5-50% by weight of an acrylate dissolved in an organic solvent.

10 Claims, No Drawings

VINYL CHLORIDE INTERPOLYMER COATING COMPOSITION

This is a divisional application of U.S. Patent Application Ser. No. 474,747, filed May 30, 1974, which is now U.S. Pat. No. 3,997,704.

TECHNICAL DESCRIPTION OF THE INVENTION

The present invention relates to a process for coating a material, e.g. a vinyl material, to improve its wear and/or weather resistance and the coated article formed thereby. The coating composition used herein when applied in either the molten state or in solution to a variety of normal sensitive substrates protects them from abrasion. The process is particularly directed to coating vinyl materials and will be described in terms of this preferred embodiment. As used herein "vinyl material" is intended to include homopolymers of vinyl chloride and copolymers of vinyl chloride with the other well-known monomers which copolymerize well with vinyl chloride, e.g., vinyl acetate.

The composition which is coated upon the vinyl material comprises a polyvinyl chloride-acrylate interpolymer which comprises from about 50-95% by weight polyvinyl chloride and 5-50% by weight of an acrylate. The polyvinyl chloride can be either a homo- or copolymer of vinyl chloride as mentioned above in connection with the definition for "vinyl material".

As used herein, the term "interpolymer" indicates the product formed by polymerizing an acrylate monomer in the presence of prepolymerized PVC. There is little or no grafting between the acrylate polymer and the PVC. The product is formed (1) by suspension polymerizing vinyl chloride under conditions whereby polyvinyl chloride is preferably obtained in a certain particle size range by means of a conventional, free radical initiated, suspension polymerization at a controlled rate of agitation and in the presence of a specified concentration of a suspending agent; (2) by removing unreacted vinyl chloride from the system after polymerization is at least 60% complete; (3) by then adding to the system an effective concentration of a chain transfer agent, a minor proportion, ie.e, up to about 50% by total solids weight, of an acrylate ester monomer or mixture of acrylate ester monomers, as hereinafter defined, and an initiator; (4) by continuing the polymerization until the thus added acrylate is polymerized in and/or on the particles of the previously polymerized PVC; and (5) by separating the polyacrylate-modified polyvinyl chloride thereby obtained. Apparently, the thus added acrylate ester monomer is absorbed by the initially prepared polyvinyl chloride particles so as to thereby produce a polyacrylate-modified PVC resin which acts as an effective topcoat for a variety of materials, e.g. vinyl materials, after being applied to the material in the molten state or in an appropriate solvent as will be described below. The polyacrylate-modified PVC resin used in this invention differs from the material described in Naps et al. U.S. Pat. No. 2,746,944 which is a graft polymer of acrylate on a preformed PVC backbone rather than an interpolymer between the acrylate and PVC containing little or no grafting. It also differs from the material described in Bader et al. Pat. No. 3,551,372 which uses far larger amounts of acrylates than the amounts used herein in a differing coating composition.

It has been found that the utilization of: (1) completely removing any unreacted vinyl chloride monomer prior to introducing and initiating the polymerization of the acrylate, (2) the addition of catalyst and acrylate as those steps are described in greater detail below, and (3) use of a chain transfer agent during the polymerization of the acrylate combine to contribute towards the attainment of a polyacrylate-modified polyvinyl chloride having excellent properties as a coating. These properties appear to be directly attributable to the fact that the moieties derived from the acrylate and from any optional comonomers which may also be present in the system, can be consistently obtained by means of this process whereas such products cannot ordinarily be prepared under conditions where (1) the unreacted vinyl chloride is not removed from the system; (2) the acrylate and catalyst are not added to the suspension PVC medium as described in greater detail later and (3) a chain transfer agent is not present in the system during the polymerization of the acrylate and any optional comonomers.

Similarly, by controlling the rate of agitation and the concentration of the suspending agent that is present in the system during the inital polymerization of the PVC as well as during the subsequent polymerization of the acrylate ester monomer, it is possible to readily control the size of the initially produced PVC particles, thereby greatly facilitating the absorption and the polymerization of the subsequently introduced acrylate and any optional monomers. In the same manner, the size of the resulting polyacrylate-modified polyvinyl chloride particles is readily maintained within the required limits so as to avoid producing them in too large a particle size thereby preventing "gell", "fish-eye" or "grain-like" surface characteristics in the final PVC coating composition formed from the particles produced by the process described herein.

The acrylate component is introduced into the system in a concentration of from about 5-50%, and preferably about 25-35%, by weight, of the previously polymerized PVC so that polyvinyl chloride comprises from about 50-95%, and preferably 65-75%, by weight, of the total weight of this product.

The acrylates which can be included in the acrylate portion are selected from the group consisting of the $C_1$-$C_4$ straight and branched alkyl methacrylates, e.g. methyl, ethyl, n-propyl and isopropyl methacrylate; the glycidyl esters of acrylic and methacrylic acid, e.g. glycidyl methacrylate and glycidyl acrylate; and, the $C_1$-$C_{12}$ alkyl acrylates wherein the alkyl group may be straight or branched, e.g. methyl, n-propyl, n-butyl, isobutyl, tert-butyl, hexyl, 2-ethylhexyl, decyl and dodecyl acrylate; or any mixtures of these acrylate monomers. It is preferred to use methyl methacrylate at 50% or above, by weight, in the acrylate component. If desired it can be the sole acrylate. Especially preferred is a polyacrylate modified PVC which comprises about 70-71%, by weight, of polyvinyl chloride and about 29-30% by weight of a polyacrylate ester moiety which in turn comprises a copolymer containing about 86-93% by weight, of methyl methacrylate and 7-14% by weight, of n-butyl acrylate.

The process for forming the particles comprises adding the appropriate amount of acrylate ester monomer, comprising, for instance, methyl methacrylate with or without one or more optional comonomers, to a previously polymerized, aqueous suspension of polyvinyl chloride. In conducting such a suspension polymerization process for the preparation of PVC, the vinyl chloride monomer, or a mixture of vinyl chloride with a minor proportion of an appropriate comonomer such as vinyl acetate or a lower alkyl acrylate, is admixed with a concentration of from about 0.01 to 5.0%, as based on the weight of the total monomer mixture, of a suspending agent such, for example, as methyl cellulose, hydroxyethyl cellulose, hydroxypropyl cellulose, carboxymethyl cellulose, talc, clay, polyvinyl alcohol, gelatine and the like. As has already been noted, the particle size of the resulting PVC particles has been found to be affected by the concentration of the suspending agent that is present in the system. Thus, it is necessary to utilize a concentration of the selected suspending agent which is within the above stated limits. For example, if the latter maximum limit for the concentration of the suspending agent is substantially exceeded, the resulting PVC particles will be well below the required particle size range which, as will be further discussed hereinbelow, is in the range of from about 5 to 150 microns. Conversely, if the lower limit of this range is not met, the resulting PVC particles will be far too large.

In addition, a monomer soluble, free radical catalyst or initiator such, for example as 2,2'-azobisisobutyronitrile, lauroyl peroxide, benzoyl peroxide or isopropylperoxy dicarbonate should be present in the system in a concentration of from about 0.01 to 3%, by weight, of the total monomer charge being utilized for the polymerization of the PVC or vinyl chloride copolymer.

Polymerization may then be initiated by heating the above-described recipe at a temperature in the range of from about 20 to 90° C. and for a period of from about 3 to 15 hours with agitation being applied throughout the course of the reaction. As was discussed hereinabove, with respect to the concentration of the suspending agent, the rate at which agitation is applied during the polymerization of the PVC is still another significant process variable which affects the particle size of the resulting PVC particles. Thus, if insufficient agitation is applied, the PVC particles will be far too large.

As will be understood by those skilled in the art, the substantial number of variations in the size and configuration of the agitation apparatus and reaction vessels which can be utilized in polymerization processes makes it impossible to set forth a range for the rate of agitation that is required to be applied in conducting the polymerization of PVC. Accordingly, the agitation rate to be applied under any specific reaction conditions will be largely dependent upon such factors as the concentration of the suspending agent that is present in the system as well as on the design of the particular agitator, e.g. the shape of its blades, and reaction vessel, e.g. the number and design of its baffles, which are being utilized. Thus, the skill of the practitioner in the art will readily enable him to make whatever adjustments may be necessary in order to prepare the resulting PVC particles so that they are all substantially within the above given particle size range of from about 5 to 150 microns and, preferably, from about 25 to 80 microns.

The size of these PVC particles is an important feature of this invention. The reason is not entirely understood, but apparently the acrylate ester monomer, i.e., methyl methacrylate and any optional monomers, is somehow improperly absorbed by PVC particles which are substantially larger than the above stated maximum of 150 microns and it cannot, therefore, be effectively polymerized.

Similarly, as has already been noted, it is necessary that the particle size of the final product, i.e, of the polyacrylate-modified polyvinyl chloride particles, be within certain limits. Thus, it is necessary that they should range in size from a minimum of about 10 microns up to a maximum limit such that no more than about 15%, be weight, are larger than about 150 microns. A preferred range is from about 40 to 150 microns. Thus, if the particles are substantially smaller than the latter minimum size, it will be extremely difficult to isolate them with conventional plant equipment. Conversely, if the maximum limit for the size of these processing aid particles is substantially exceeded, "gells", "fish-eye", and the above described "applesauce" effect will be imparted to the coating containing such oversized particles.

Polymerization of the subsequently added acrylate ester monomer is initiated by at least one standard monomer soluble, i.e, oil-soluble, free radical initiating catalyst. Suitable catalysts include, 2,2'-azobisisobutyronitrile, lauroyl perioxide, benzoyl peroxide, t-butyl peroxypivalate and isopropylperoxy dicarbonate. The catalyst can either be premixed with the acrylate prior to addition to the warm suspension PVC medium, as described in Kraft et al. U.S. Pat. No. 3,928,500 or by addition of both acrylate and non-premixed catalyst to the PVC suspension when the latter is cool as described in Dyer et al. U.S. Pat. No. 3,919,137 followed by application of heat to the suspension medium. The former procedure for adding acrylate and initiator is the preferred method. Processes for forming the type of interpolymers used in the present invention are described and claimed in these applications.

Chain transfer agents are used during the polymerization of the acrylate and any optional monomers, in order to further control the final properties of the resulting acrylate modified PVC particles. These chain transfer agents, can be selected from the group consisting of:

1. chlorinated aliphatic hydrocarbons such as carbon tetrachloride, chloroform, methylene chloride, butyl chloride, methyl chloroform, propylene chloride and trichloroethylene;
2. aromatic hydrocarbons such as toluene, xylene, mesitylene, cumene, ethyl benzene, t-butyl benzene and chlorobenzene;
3. aldehydes such as acetaldehyde, propionaldehyde, benzaldehyde and crotonaldehyde;
4. aliphatic and cyclic ketones such as methyl ethyl ketone, acetone, diethyl ketone, methyl isobutyl ketone and cyclohexanone methyl ethyl ketone;
5. cyclic ethers such as dioxane and tetrahydrofuran;
6. alkyl esters of aliphatic carboxylic acids such as methyl isobutyrate and ethyl acetate;
7. aliphatic alcohols such as sec-butyl alcohol, n-butyl alcohol, isobutyl alcohol and t-butyl alcohol;
8. aliphatic carboxylic acids such as acetic acid;
9. cyclic hydrocarbons such as methyl cyclohexane; and, most preferably
10. mono- di- and polymercaptans including mono-mercaptans such as methyl mercaptan; ethyl mercaptan; propyl mercaptan; n-butyl mercaptan; n- and t-butyl mercaptan; n- and t-phentyl mercaptan; hexyl mercaptan; n- and t-heptyl mercaptan; n- and t-octylmercaptan; n- and t-decyl mercaptan; n-dodecyl, i.e., lauryl, and t-dodecyl mercaptan; n- and t-octadecyl mercaptan; n- and t-cicosyl mercaptan; n- and t-pentacosyl mercaptan; n- and t-octacosyl mercaptan; n- and t-triconyl mercaptan and blends thereof. From this group of mono-mercaptans, it is preferred to use lauryl mercaptan.

Other operable monomercaptans include thiocetic acid; 1-mercapto-2-butanone; methyl mercaptoacetate; ethyl mercaptothioacetate; 1-mercapto-2-ethoxyethane; diethyl mercaptoethyl phosphorotrithioate; 2-mercaptoethyl acetamide; dimethyl aminomethyl mercaptan; cysteamine; mercaptomethylthiopropane; monomercaptocyclohexane; benzyl mercaptan; cysteine; and, mercaptoethnol.

Suitable dimercaptan chain transfer agents can be illustrated by ethanedithiol; 2,3 dimercaptopropanol; decanedithol-1,10 and the like.

Suitable polymercaptan chain transfer agents having more than 3 mercaptan groups per molecule can be illustrated by pentaerythritol tetra (7-mercaptoheptanoate); mercaptoacetic acid triglyceride; pentaerythritol tri(beta-mercaptopropionate); pentaerythritol tetra(beta-mercaptopropionate); cellulose tri(alphamercaptoacetate); 1,2,3-propane-trithiol, 1,2,3,4-neopentane tetrathiol; 1,2,3,4,5,6-mercaptopoly(ethyleneoxy)ethyl(sorbitol); 1,1,1-trimethyl propane tri(alpha-mercaptoacetate); dipentaerythritol hexa(3-mercaptopropionate); 1,2,3-tris(alpha-mercaptoacetypropane; thiopentaerythritol tetra(alpha-mercaptoacetate;, 1,6,10-trimercaptocyclododecane, 1,2,3,4,5,6-hexamercaptocyclohexane; N,N', N"N"'-tetra(2-mercaptoethyl)-pyromellitamide; tri-(2-mercaptoethyl)nitriolotriacetate; pentaerythritol tri(alpha-mercaptoacetate); pentaerythritol tetra(alpha-mercaptoacetate); tri(p-mercaptomethylphenyl)methane; 2,2,7,7-tetrakis(mercaptomethyl) -4,5 dimercapto-octane; 5,5,5-tri(mercaptoethyl)phosphorotrithioate; xylitol penta(beta-mercaptopropionate); and, the like.

Illustrative of low molecular weight polymeric materials having at least 3 pendant mercaptan groups per molecule are homopolymers and copolymers of vinyl thiol, e.g., polyvinyl thiol. Other polymeric thiols, such as glycerol/ethylene glycol polyether polymercaptan can also be used as chain transfer agents in forming the particles to be used in the coating.

From the above group, optimum results are, however obtained by the use of low molecular weight polymercaptans having from 3,5 mercaptan groups per molecule as illustrated by pentaerythritol tetrathioglycolate; pentaerythritol tetra(3-mercaptopropionate); trimethylolethane tri(3-mercaptopropionate); xylitol penta(beta-mercaptopropionate); trimethylolethane trithioglycolate trimethylolpropane tri(3-mercaptopropionate); and, trimethylolpropane trithioglycolate. The use of the latter polymercaptans are preferred since they are most efficient with respect to the reate of polymerization which is attainable in the system wherein they are utilized.

With respect to the amount of chain transfer agent used in the process of this invention, this will largely be determined by the particular chain transfer agent that is selected. However, in most instances they may be utilized in a concentration of from about 0.025-7.5%, as based on the total weight of the acrylate ester monomer charge. In general, mercaptans, and particularly polymercaptans, are more efficient and may be used in concentrations at the lower end of the latter range whereas less efficient chain transfer agents, such as the aromatic hydrocarbons, will be used in concentrations at the upper end of this range.

By utilizing a chain transfer agent, it is possible to exercise a greater degree of control upon the molecular weight, i.e., to prevent the attainment of a molecular weight which is higher than the maximum value in the below stated range, of that portion of the final polymeric product which is derived from the acrylate. This, in turn, affects the molecular weight of the product as a whole. Thus, it may be here stated that the products resulting from the process should, preferably, have a molecular weight, as expressed in terms of their Relative Viscosity, as determined in a 1%, by weight, solution of the polymer in cyclohexanone at 25° C, of from about 1.50–2.80 and, preferably, from about 2.30–2.60. Thus, it has been found that those products having a Relative Viscosity within this range will display the desired characteristics when incorporated in a coating on the vinyl material. As is known to those skilled in the art, Relative Viscosity is calculated by the use of the following formula:

$$\text{Relative Viscosity} = T_1/R_2$$

where $T_1=$ the time required for the passage of a standard volume of the polymer solution through an orifice in a viscometer and $T_2=$ the time required for the passage of a standard volume of the solvent through the orifice in the identical viscometer.

The polymerization of the acrylate ester monomer is conducted by heating the system, i.e., the selected chain transfer agent, the previously prepared PVC host polymer and the mixture of the catalyst with the acrylate ester monomer, at a temperature of from about 40° to 100° C. for a time sufficient to completely polymerize the acrylate ester monomer in and/or on the host PVC particles. It is to be pointed out that it is not ordinarily necessary to introduce any fresh suspending agent into the system since a sufficient quantity will already be present from the initial polymerization of the PVC.

The particular catalyst, temperature, reaction time and other operating conditions chosen are, of course, interdependent and may be those ordinarily employed in the polymerization of MMA. Other variations in polymerzation technique will suggest themselves to those skilled in the art.

The process of this invention is particularly satisfactory when conducted with polyvinyl chloride homopolymers as the initially prepared vinyl chloride host polymer. However, as has already been briefly noted, there can also be employed the usual copolymers of vinyl chloride with minor proportions of one or more ethylenically unsaturated, i.e., vinyl, comonomers provided that the resulting vinyl chloride copolymers are within the above specified particle size and Relative Viscosity ranges.

Illustrative of these vinyl comonomers which can be used in preparing either the vinyl chloride host polymer of the coating composition of this invention or the vinyl chloride polymer material upon which these coating compositions may be placed include alpha-olefins such as ethylene, propylene and butylene; vinyl esters of carboxylic acids such as vinyl acetate, vinyl propionate, vinyl butyrate, and vinyl stearate; $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and mitro- substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$14 $C_{20}$ mono- and dialkyl esters such as aconitic acid, fumaric acid, maleic acid, itaconic acid, citraconic acid, maleic anhydride, dibutyl fumarate and mono-diethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone; $C_1$-$C_{20}$ alkyl vinyl ethers such as methyl vinyl ether, ethyl vinyl ether and stearyl vinyl ether; dienes such as isoprene and butadiene; and, glycidyl esters of acrylic and methacrylic acid such as glycidyl acrylate and glycidyl methacrylate, etc.

The polyvinyl chloride-acrylate particles when formed can be applied to the vinyl material as a coating by any means known to the art, e.g., knife coating, roller coating and spray coating of a solution or by applying them in the molten state. The resin particles are preferably first dissolved in a suitable organic solvent, e.g. ketones such as methyl ethyl ketone, tetrahydrofuran, methyl isobutyl ketone, acetone, cyclohexanone or mixtures thereof in an amount ranging from 5% to 35%, by weight, preferably 10% to 20%. It is well within the skill of a person in the art to adjust the amount of solvent to give the best results with the particular application that is chosen. This solution is then added to the surface of the vinyl material in an amount ranging from 0.05 mil to 3.0 mil, preferably 0.2 – 0.5 mil.

The invention is further illustrated by the following Examples:

EXAMPLE I

This example illustrates the preparation of one of the preferred polyacrylate-modified PVC interpolymers used in this invention.

Part 1

A 20 gallon Pfaudler reactor is charged with a standard recipe, as given below for preparing suspension grade polyvinyl chloride. The polymerization is conducted at 60° C. for 5½ hours, with agitation being applied at a rate of about 300 rpm, resulting in the preparation of PVC particles having an average particle size of about 25–30 microns:

|  | Parts |
| --- | --- |
| Vinyl Chloride | 221 |
| Water | 234 |
| Methyl Cellulose | 50 (1% aqueous solution) |
| 2,2'-azobisisobutyronitrile (Catalyst) | 0.144 |

Part 2

When the reaction of Part 1, hereinabove, is essentially complete, i.e., about 80–85% conversion, all of the excess vinyl chloride monomer is vented off whereupon 0.027 parts of lauryl mercaptan chain transfer agent followed by a mixture of 93 parts of methyl methacrylate, i.e., MMA, and 7 parts of n-butyl acrylate which has first been pre-mixed with 0.063 parts of additional 2,2'-azobisisobutyronitrile catalyst, are added. Under agitation at a rate of 300 rpm, the polymerization is allowed to proceed for about 5 hours at 75° C. until the MMA is polymerized in and/or on the host PVC particles. The resulting resin product, which comprises particles containing about 70%, by weight, of PVC and about 30%, by weight, of a polyacrylate moiety comprising about an 93:7 methyl methacrylate:n-butyl acrylate copolymer, has a Relative Viscosity as determined under the conditions described hereinabove, of about 2.50. The particle size of this polyacrylate-modified PVC resin is such that no more than about 10.1%, by weight, is larger than about 150 microns.

EXAMPLE II

The resin from Example I was dissolved in methyl ethyl ketone so that the solution comprises about 85% by weight methyl ethyl ketone and 15% by weight resin. It was added to the cold solvent by slow sifting with stirring. When addition was completed, the temperature was raised to 140° F to hasten solubilization. When the resin was totally solubilized the solution was cooled to room temperature and was ready for coating operations.

The resin was applied by a wire wound rod, and the coated vinyl was dried at 270° F for 2½ minutes in a forced air drying oven. During this period the solvent evaporated from the resin solution leaving a clear continuous resin film.

EXAMPLE III

Two coated articles similar to that produced in Example II were tested for wear properties using the Wyzenbeck wear test. This test utilizes a 8 Duck material which rubs the surface of the vinyl. The rubbing takes place with a 3 lb. pressure of the abradant duck material against the coated vinyl and a 4 lb. tension on the duck material. The results for two different film thicknessess utilizing two different number of cycles:

| Film Thickness | No. of Cycles | Results |
| --- | --- | --- |
| 0.24 mil | 50,000 | 20% color transfer* |
| 0.60 mil | 100,000 | Very slight color transfer |

*Indicates color transfer of pigment in the vinyl substrate to the abradant material.

EXAMPLE IV

The stain resistance and cleanability of a coated vinyl article were examined. Common household articles, e.g., mustard, ketsup, lipstick, oil and water based inks were used to stain the coated vinyl. The stains were allowed to stand on the coated vinyl for 18 hours at 72° F and 50% relative humidity. After this period they were washed with mild soap and warm water and the degree of staining which remained on the vinyl was noted. All stains were slight and readily were washed off with little resistance. Only the mustard and oil based ink stains remained.

EXAMPLE V

The coated vinyl was exposed to ultraviolet radiation for four weeks in an American Cyanamid Test Cabinet (Fadeometer) FBSL containing fluorescent, blacklight and sunlamps. No discoloration or loss of flexibility was found. Ordinarily merely 200 hours or over exposure with these results would be considered acceptable.

The coating of the present invention has a wear resistance that is as good as commerically used polyvinyl chlorideacrylic blend coatings but has superior weather resistance and is less costly.

What is claimed is:

1. A coating composition adapted to be used to coat a material which comprises (a) an organic solvent, and (b) an interpolymer formed by polymerizing an acrylate in the presence of a vinyl chloride containing polymer formed by suspension polymerization, said interpolymer containing from about 50% to 95%, by weight, vinyl chloride polymer and from about 5% to 50%, by weight, of an acrylate, said vinyl chloride containing polymer having a particle size of from about 5 to about 150 microns.

2. A composition as claimed in claim 1 wherein the interpolymer comprises about 65–75% by weight polyvinyl chloride.

3. A composition as claimed in claim 1 wherein the interpolymer comprises about 25–35% by weight of the acrylate.

4. A composition as claimed in claim 1 wherein the acrylate is selected from the group consisting of the $C_1$–$C_4$ alkyl methacrylates, the glycidyl esters of acrylic and methacrylic acid, and the $C_1$14 $C_{12}$ alkyl acrylates.

5. A composition as claimed in claim 1 wherein methyl methacrylate comprises greater than about 50% by weight of the acrylate.

6. A composition as claimed in claim 1 wherein the acrylate comprises about 86–93% by weight methyl methacrylate and about 7–14% by weight n-butyl acrylate.

7. A composition as claimed in claim 1 wherein the coating composition comprises from about 5% to 35% by weight of the interpolymer.

8. A composition as claimed in claim 1 wherein the organic solvent is selected from the group consisting of methyl ethyl ketone, methyl isobutyl ketone, acetone, cyclohexanone, tetrahydrofuran and mixtures thereof.

9. A composition as claimed in claim 1 wherein the interpolymer has a particle size of from about 10 microns to a maximum value wherein not more than about 15% by weight are larger than about 150 microns.

10. A composition as claimed in claim 1 wherein the interpolymer is present at from 10% to 20%.

* * * * *

UNITED STATES PATENT AND TRADEMARK OFFICE
CERTIFICATE OF CORRECTION

PATENT NO. : 4,067,841
DATED : January 10, 1978
INVENTOR(S) : Joseph A. Aurichio It is certified that error appears in the above-identified patent and that said Letters Patent are hereby corrected as shown below:

Col. 1, line 44, "ie.e," should be -- i.e., --;

Col. 5, line 10, "mercaptoethnol" should be -- mercaptoethanol --;

Col. 5, line 44, "3,5" should be -- 3-5 --;

Col. 5, line 52, "reate" should be -- rate --;

Col. 6, line 63, "mitro" should be -- nitro --;

Col. 6, line 68, "$C_1 14\ C_{20}$" should be -- $C_1-C_{20}$ --;

Col. 8, line 13, "140°F" should be -- 140°F to 160°F --;

Col. 8, line 63, "chlorideacrylic" should be --chloride-acrylic--; and

Col. 9, line 21, "$C_1 14 C_{12}$ should read -- $C_1-C_{12}$ --.

Signed and Sealed this

Thirtieth Day of May 1978

[SEAL]

Attest:

RUTH C. MASON
Attesting Officer

LUTRELLE F. PARKER
Acting Commissioner of Patents and Trademarks